(12) United States Patent
Johnson et al.

(10) Patent No.: US 11,373,549 B2
(45) Date of Patent: Jun. 28, 2022

(54) BRAILLE WRITING DEVICE

(71) Applicants: Hilary Anna Johnson, Portland, OR (US); Alexander H Slocum, Bow, NH (US)

(72) Inventors: Hilary Anna Johnson, Portland, OR (US); Alexander H Slocum, Bow, NH (US)

(*) Notice: Subject to any disclaimer, the term of this patent is extended or adjusted under 35 U.S.C. 154(b) by 474 days.

(21) Appl. No.: 16/016,597

(22) Filed: Jun. 23, 2018

(65) Prior Publication Data

US 2020/0219415 A1    Jul. 9, 2020

Related U.S. Application Data

(60) Provisional application No. 62/523,882, filed on Jun. 23, 2017.

(51) Int. Cl.
*G09B 21/02* (2006.01)
*G09F 3/10* (2006.01)
*G09F 3/02* (2006.01)

(52) U.S. Cl.
CPC ............. *G09B 21/02* (2013.01); *G09F 3/10* (2013.01); *G09F 2003/0208* (2013.01)

(58) Field of Classification Search
CPC .... G09B 21/02; G09F 3/10; G09F 2003/0208
USPC ......................................................... 434/115
See application file for complete search history.

(56) References Cited

U.S. PATENT DOCUMENTS

| | | | | |
|---|---|---|---|---|
| 3,837,456 A | * | 9/1974 | Ruskin | B41J 3/39 400/134.4 |
| 4,079,825 A | * | 3/1978 | Fewell | B41J 3/32 101/18 |
| 4,215,490 A | * | 8/1980 | Fewell | G09B 21/003 434/114 |
| 5,636,565 A | * | 6/1997 | Lawrance | B31F 1/07 101/32 |
| 6,247,400 B1 | * | 6/2001 | Litschel | B41J 3/32 101/18 |
| 2005/0088417 A1 | * | 4/2005 | Mulligan | G06F 3/04886 345/173 |

* cited by examiner

*Primary Examiner* — Thomas J Hong

(57) ABSTRACT

A handheld device to enable a person to create Braille impressions in adhesive tape as labels or messages, where the device includes a hollow base structure, with a tape exit port, and a top region with flexurally hinged embossing arms whose tips converge to a central region, where the tips have downwardly projecting convex bump structures located above concave bump receiving structures, and a tape holding structure onto which a roll of tape can be placed, whereby tape coming from the roll can pass between the convex and concave bump structures, over the cutting edge and out the tape exit port. Furthermore, the device can have a cover structure with flexurally hinged members located above, and coupled to, the hinged embossing arms with snap domes to provide an audible click and tactile cue when the flexurally hinged members are pushed down on by a user's fingers.

9 Claims, 8 Drawing Sheets

BRAILLE WRITING DEVICE

BRAILLE WRITING DEVICE

The present invention relates to a device that embosses tactile dots on tapes of different materials including plastic and paper to enable braille writing and labeling.

FIELD OF THE INVENTION

The present invention relates to the mechanisms combined to form a braille writing device that embosses braille dot combinations, called characters, onto an embossing medium and increments the embossing medium to create accurate and repeatable spacing of the braille characters.

STATEMENT REGARDING FEDERALLY FUNDED RESEARCH

This invention was made without Federal funding.

BACKGROUND OF THE INVENTION

Braille script is the means by which many people with blindness and visual impairment read and write. While reading braille is simply done by moving the tips of the fingers over raised script, writing braille requires the use of tools or devices to emboss the small dots to the standard shape and height, with correct spacing between the dots within a braille cell, and with consistent spacing between the cells. Braille script is not a language in of itself, instead it is a code that can be associated or mapped onto the letters or characters within any written language, including alphabet letters, numbers, and punctuation marks. Within many languages there are three grades of braille. Grade 1 is a letter by letter transcription useful for early learning and basic literacy. Grade 2 uses a single cell to represent a whole work or phrase, including abbreviations and contractions, which is useful for shortening messages and reading more efficiently. Grade 3 is less common and is comprised of non-standardized personal shorthand. There are also special braille codes for math and music.

Although braille literacy is correlated with higher employment rates and greater independence, one of the barriers to entry for reading and writing braille is the lack of effective and accessible technology available to people with blindness to independently write braille. Some might argue that braille technology is unnecessary with more accessible tools for audible learning, but just as sighted people learn and communicate through numerous modes including visual, oral, auditory, and written, people with blindness want and need access to the same opportunities to learn effectively. Furthermore, written labels are essential for people to independently identify many objects including, but not limited to: food packaging, medications, containers, drawers, desk supplies, folders and papers, maps and diagrams, household objects, and buttons on appliances. Braille labels on all of these objects allow persons with blindness to live more independently.

There are a number of braille writers that are used by persons with blindness, but a gap analysis of the state of the art shows that there is no label maker that is inexpensive, yet durable, easy to use, and can be used for any of the more than 130 braille languages globally. The lowest cost, commonly used device in both the United States and the developing world for writing braille is a slate and stylus, U.S. Pat. No. 3,340,625A. The slate and stylus requires users to meticulously decide and feel each dot location, place the stylus, and then press the dot. Furthermore, it requires the user to write mirrored from the way they would naturally read, making it difficult to learn how to use. Braillers, like the Perkins brailler, are braille type writers with six keys that individually emboss each dot in the cells on sheets of paper. Because they are expensive and heavy they are most often found in schools, but not commonly used in daily life. Developments in technology have led to digital brailler writers that convert text to braille, allow users to type messages, and navigate applications and webpages, but these devices do not meet the need for braille tangibly realized in environments and connected to objects. The reason for the expense of these devices, among many, are that it is functionally difficult to meet the precision and repeatability requirements of braille writing, often requiring complex mechanical electrical systems with numerous actuators and specialized tape medium. Thus, the current state of the art devices and tools for writing braille do not meet the cost, efficiency, and accessibility requirements of the blind, particularly those living in developing countries on small incomes, thus motivating the design of this braille writer to meet these functional requirements.

OBJECTS OF THE INVENTION

A principal object of this invention, therefore, is to provide a new and improved handheld device for writing braille onto a tape, to enable greater accessibility for the blind and visually impaired.

A further object of this invention is to provide a braille writing device comprised of simply molded plastic parts that have no need for side pulls in their molds.

A further object of this invention is to provide a braille writing device comprised of simply molded plastic parts that snap together using elastically averaging precision alignment features.

SUMMARY

In summary, the invention embraces a handheld device to enable a person to easily create impressions in adhesive tape to enable a person to read a Braille message, where the device includes a hollow base structure, graspable by a person's one or two hands, with a tape exit port located adjacent to a cutting edge, and a top region with flexurally hinged embossing arms whose tips converge to a central region, where the tips have downwardly projecting convex bump structures located above concave bump receiving structures, and a tape holding structure onto which a roll of tape can be placed whereby tape coming from the roll can pass between the convex and concave bump structures and over the cutting edge and out the tape exit port. Furthermore, the device can have a cover structure with flexurally hinged members, with concave fingertip receiving depressions, located above and coupled to the hinged embossing arms with snap domes to provide an audible click and tactile cue when the flexurally hinged members are pushed down on by a user's fingers.

BRIEF DESCRIPTION OF THE DRAWINGS

These and other features, aspects, and advantages of the present invention can best be understood with regard to the following description and appended claims in conjunction with the accompanying drawing, in which:

Figure 1A:
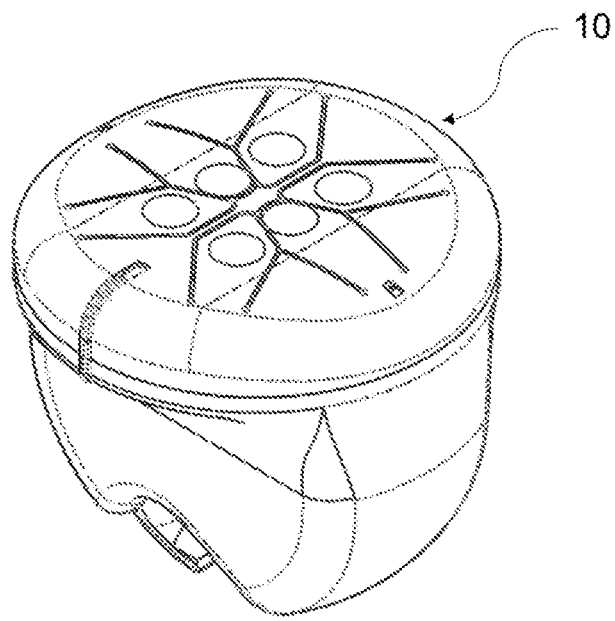
FIG. 1A shows a perspective view of an assembled example device in accordance with an implementation of the present concepts.

In the drawings, preferred embodiments of the invention are illustrated by way of example, it being expressly understood that the description and drawings are only for the purpose of illustration and preferred designs, and are not intended as a definition of the limits of the invention.

DETAILED DESCRIPTION

The preferred embodiment of the device is comprised of six tapered beams with small dots at the tips, which are designed such that they will precisely and repeatedly create impressions onto the tape medium. Underneath these embossing arms, is a structurally stable platform with small concave cups aligned such that the tip of the beams mate with the cups pressing the tape medium between them. The beams and embossing platform parts are connected such that the beams can be repeatedly and precisely removed and reattached while maintaining accurate alignment. The embossing platform is integrated with the tape holder and an indexing mechanism that spaces the cells using a ratchet drum and pawl to give the user haptic feedback in the form of a tactile and/or auditory click when the tape is incremented. On top of the embossing arms is a top button cap that provides ergonomically spaced, flexural buttons for the user to press to provide the force necessary at the tip of the beams to emboss the tape. The interface between columns extruding downwards from the curved cantilevered beam buttons and a small platform on top of the tapered embossing beams transmits the press force to emboss the dot, and slips off the platform after the dot is created, creating a click haptic feedback for the user.

Due to the precision required for the beams to connect with the embossing platform, providing repeatable and accurate dots, the technical invention of this devices identifies and utilizes optimized geometry for beam bending and deflection. These mechanical elements are often called flexures and are advantageous in this design because all six beams can be injection molded in a single piece without need for joints, or connections. Furthermore, the use of elastic averaging features to connect the embossing beams with the body of the device and with the ergonomic buttons averages errors. Finally, the arrangement of the components of the device allows for a small handheld form factor, and uses the orientation of the natural stickiness of the tape to roll the ratchet drum to increment the tape medium to create space between the embossed characters, while keeping the tape from sticking to the embossing platform.

This first preferred embodiment will now be described in detail in conjunction with the drawings.

Figure 1B:
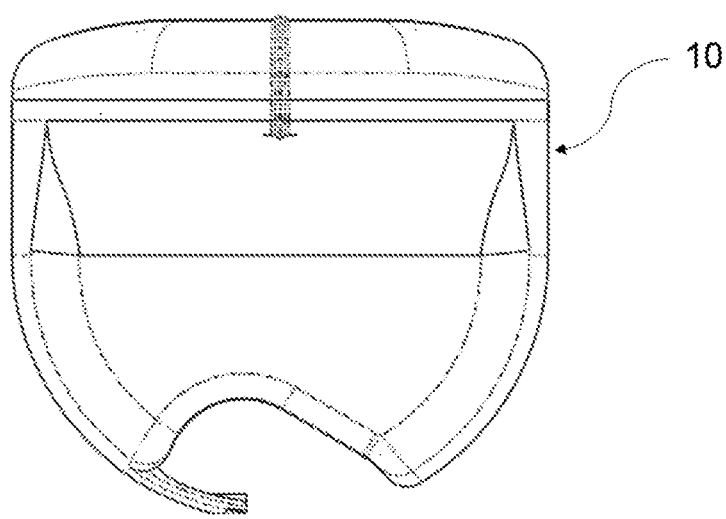
FIG. 1B shows a side view of an assembled example device in accordance with an implementation of the present concepts.

FIG. 1A shows a perspective view of the first preferred embodiment of the device, 10, in accordance with the present invention, preferably composed of an injection moldable thermoplastic. FIG. 1B shows a side view of said device.

Figure 2:
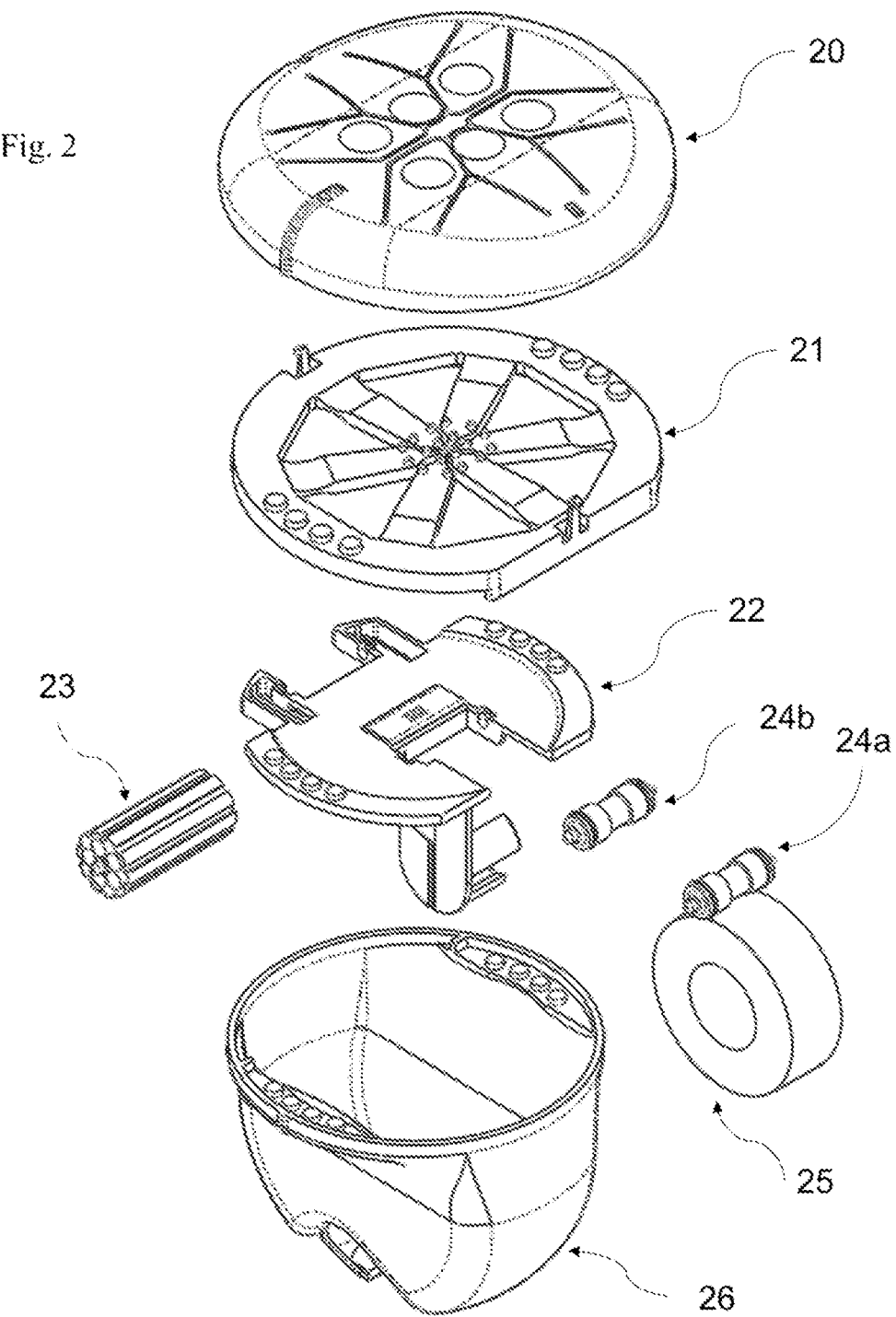
FIG. 2 shows an exploded perspective view of an example device in accordance with an implementation of the present concepts.

FIG. 2 shows an exploded perspective view of said device. The base structure, 26, contains a tape handling structure, 22, a tape medium, 25, a ratchet drum, 23, two tape handling rollers, 24a and 24b, and connects with the top cap, 20, and ring embossing arm structure, 21.

Figure 3A:
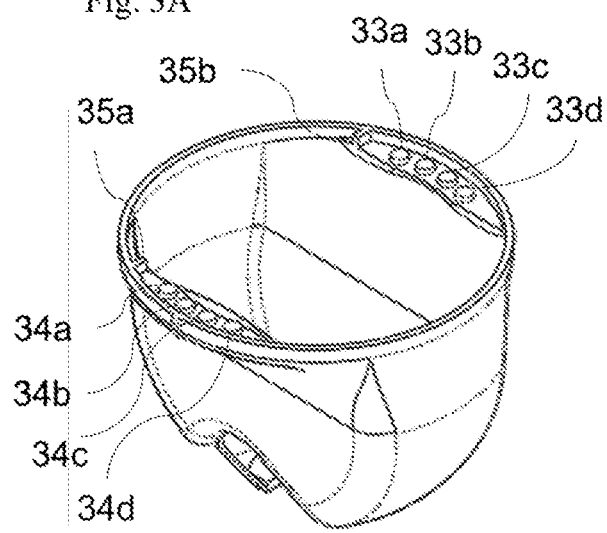
FIG. 3A shows a perspective view of a base structure of an example device in accordance with an implementation of the present concepts.
Figure 3B:
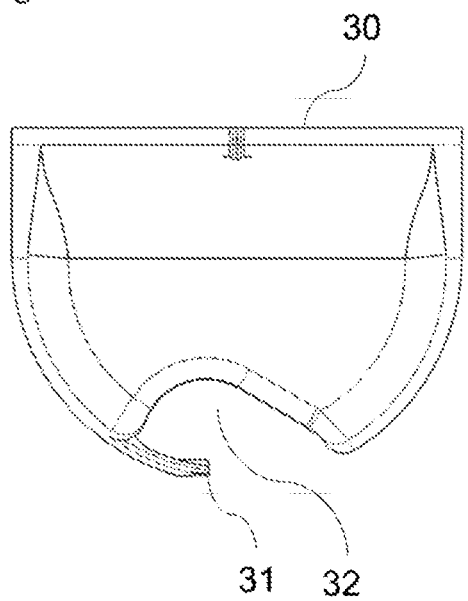
FIG. 3B shows a side view of a base structure of an example device in accordance with an implementation of the present concepts.

FIG. 3A, perspective view, and FIG. 3B, side view, show details of the base structure, including a receiving region, 30, the cutting edge, 31, a tape exit port, 32, and alignment features, 33a, 33b, 33c, 33d, 34a, 34b, 34c, 34d, and 35a, 35b.

Figure 4A:
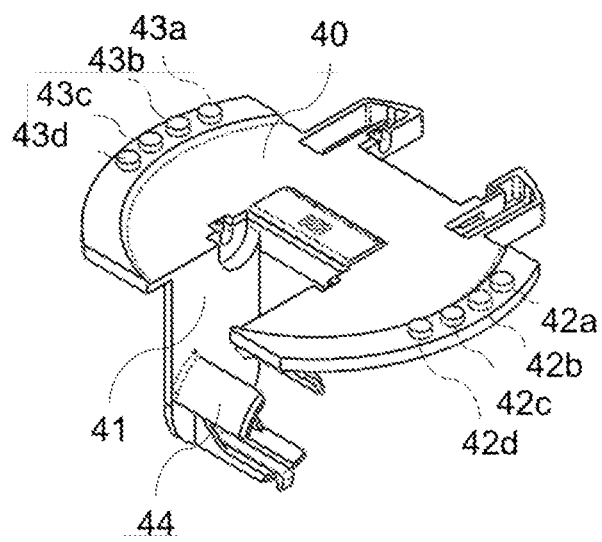
FIG. 4A shows a perspective view of a tape handling structure of an example device in accordance with an implementation of the present concepts.
Figure 4B:
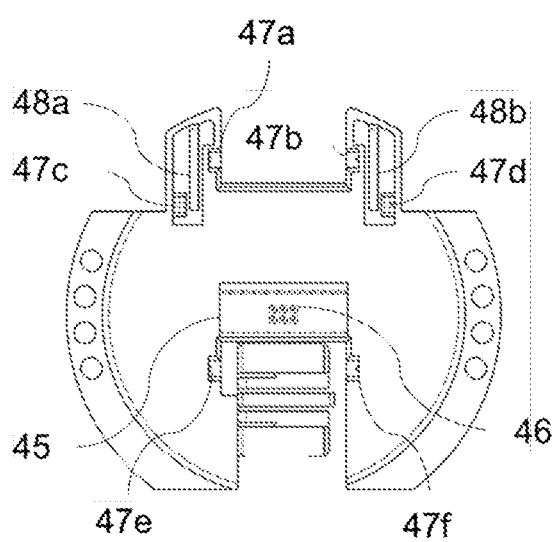
FIG. 4B shows a top view of a tape handling structure of an example device in accordance with an implementation of the present concepts.

FIG. 4A, perspective view, and FIG. 4B, top view, show details of the tape handling structure, which holds tape handling elements including a ratchet drum, tape handling rollers, and a tape. The planar top region, 40, is connected to a downward protruding structure, 41. A tape reel axle holding structure, 44, horizontally projects from the downward protruding structure, 41. Alignment features, 42a, 42b, 42c, 42d, 43a, 43b, 43c, 43d, are on the planar top region, 40, and connect with a base structure and a ring embossing arm structure. An embossing anvil, 45, forms the surface for six concave features, 46, arranged in a two by three grid. Three pairs of coaxial grooves, 47a and 47b, 47c and 47d, and 47e and 47f, accept cylindrical axles. One or more pawls, 48a and 48b, engage notches in a ratchet drum.

Figure 5A:
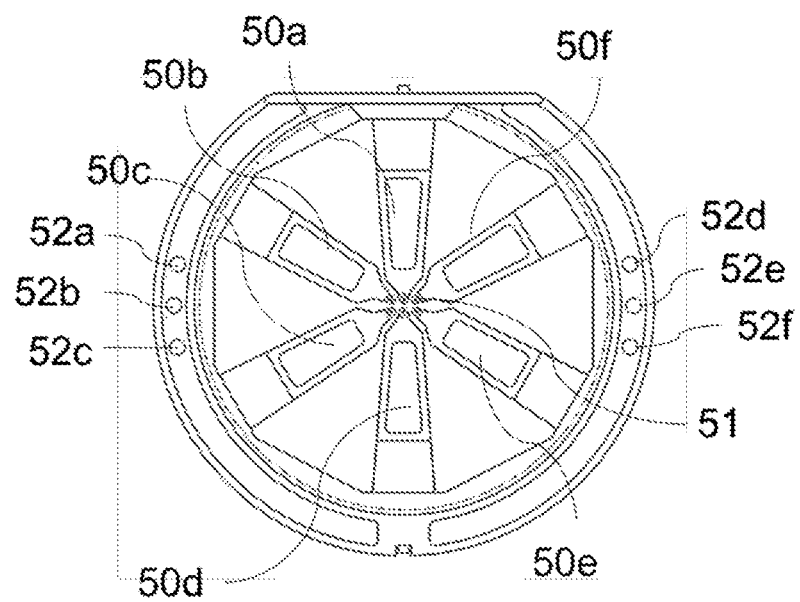
FIG. 5A shows a bottom-up view of a ring embossing arm structure of an example device in accordance with an implementation of the present concepts.
Figure 5B:
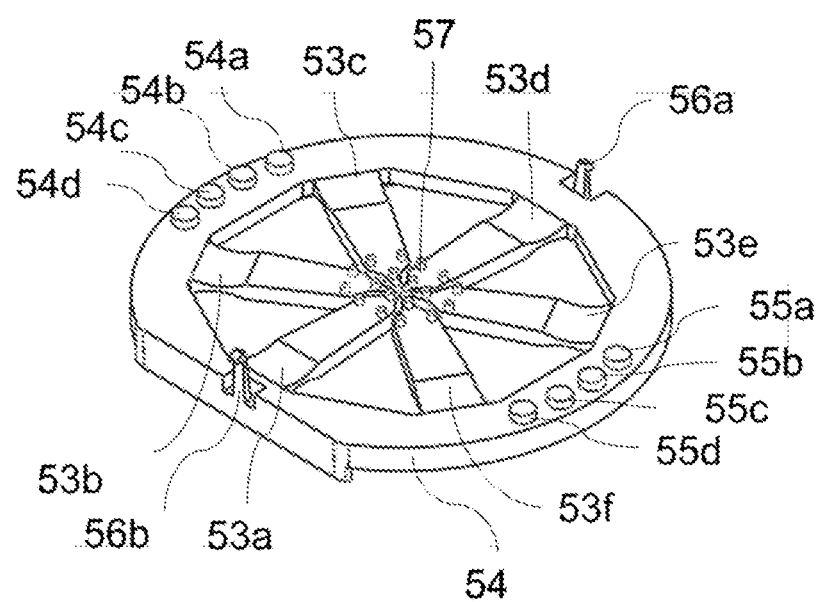
FIG. 5B shows a top-down perspective view of a ring embossing arm structure of an example device in accordance with an implementation of the present concepts.

FIG. 5A, a bottom-up view, and FIG. 5B, a top-down perspective view, show embossing arms, 50a, 50b, 50c, 50d, 50e, 50f, connected to a ring embossing arm structure, 54, projecting radially inwards, each with a flexural hinge member, 53a, 53b, 53c, 53d, 53e, 53f, each tapering to a tip, where the convex tips on the arms form three rows of two, 51. The tips of the embossing arms align with the concave features on the embossing anvil. The top alignment and attachment features, 54a, 54b, 54c, 54d, 55a, 55b, 55c, 55d, connect with a top cap, while the bottom alignment and attachment features, 52a, 52b, 52c, 52d, 52e, 52f, connect with a tape handling structure. Snap hooks, 56a and 56b, connect the ring embossing arm structure to a top cap. On the top of the embossing beams, towards the distal tip, is an attachment feature, 57, for a flexural snap at the interface between said embossing arms, 50, and flexural button members, 60.

Figure 6A:
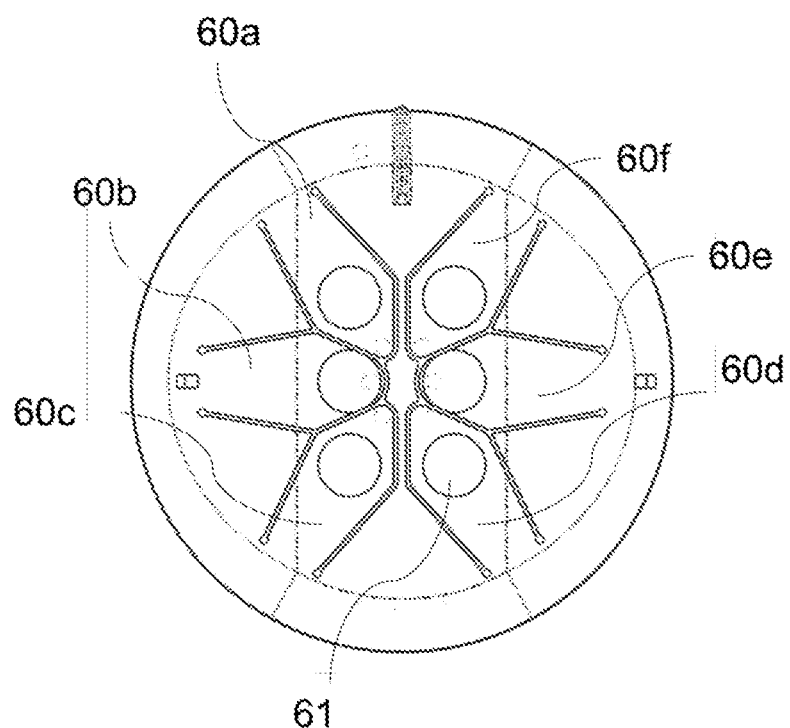
FIG. 6A shows a top-down view of a top cap of an example device in accordance with an implementation of the present concepts.
Figure 6B:
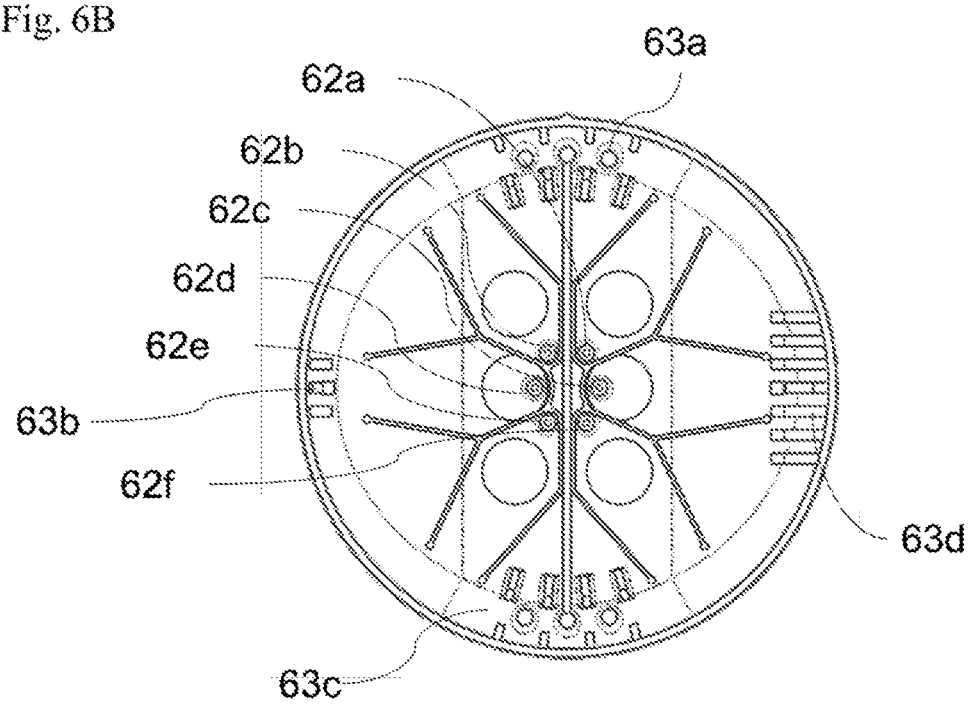
FIG. 6B shows a bottom-up view of a top cap of an example device in accordance with an implementation of the present concepts.

FIG. 6A, a top-down view, and FIG. 6B, a bottom-up view, show a top cap, open on the bottom, with six flexural button arms, 60a, 60b, 60c, 60d, 60e, and 60f, pointing inwardly, accessible by a person's fingers while grasping said base structure. A person's fingers can be placed on the concave features, 61, on the button arms. A downward column attached at the distal end of each button arm, 62a, 62b, 62c, 62d, 623, 62f, transfers forces respectively from said flexural buttons arms, 60, to said embossing arms. Underneath the top cap is a downward facing receiving region for connecting to said ring embossing arm structure. Said receiving region includes alignment and attachment features, 63a, 63b, 63c, and 63d.

Figure 7A:
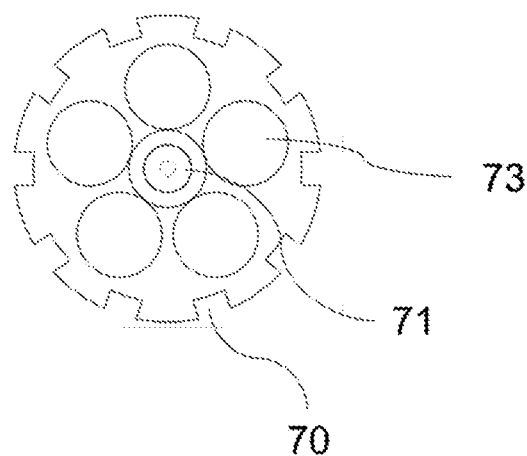
FIG. 7A shows a side view of a ratchet drum of an example device in accordance with an implementation of the present concepts.
Figure 7B:
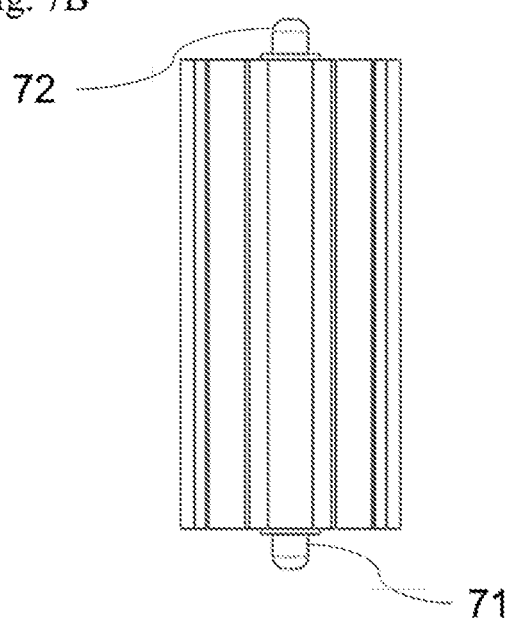
FIG. 7B shows a top-down view of a ratchet drum of an example device in accordance with an implementation of the present concepts.

FIG. 7A, a side view, and FIG. 7B, a top-down view, show a ratchet drum with axial grooves 70, equally spaced about the circumference of the drum. Two roller surfaces are located in the center, with protruding cylindrical axles, 71 and 72, which rotate in one of the tape handling structure's coaxial groove pairs. Empty cavities in the drum, 73, are for manufacturing. The ratchet drum rolls on the protruding axles and is rotated by the tape wrapped around the drum. The ratchet and pawl give the user feedback when the tape is moved by the increment between the grooves. The pitch between the grooves is 6.2 mm corresponding to the accepted spacing between braille characters.

Figure 8:
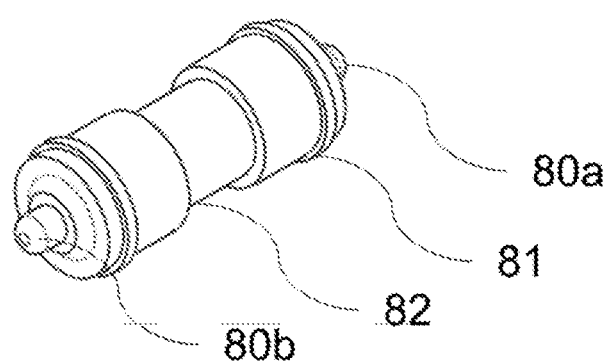
FIG. 8 shows a perspective view of a tape roller of an example device in accordance with an implementation of the present concepts.

FIG. 8, a perspective view, shows a cylindrical tape guiding roller with cylindrical guides for the tape, 81, and with protruding cylindrical axles, 80a and 80b, which rotate in the tape handling structure's coaxial groove pairs. The tape guiding rollers, 24a and 24b, reduce friction as the tape moves from the tape roll over the embossing anvil, 45, and down to the ratchet drum. The central groove, 82, provides a space for the embossed braille characters so they are not flattened out when the tape passes over them.

Figure 9:
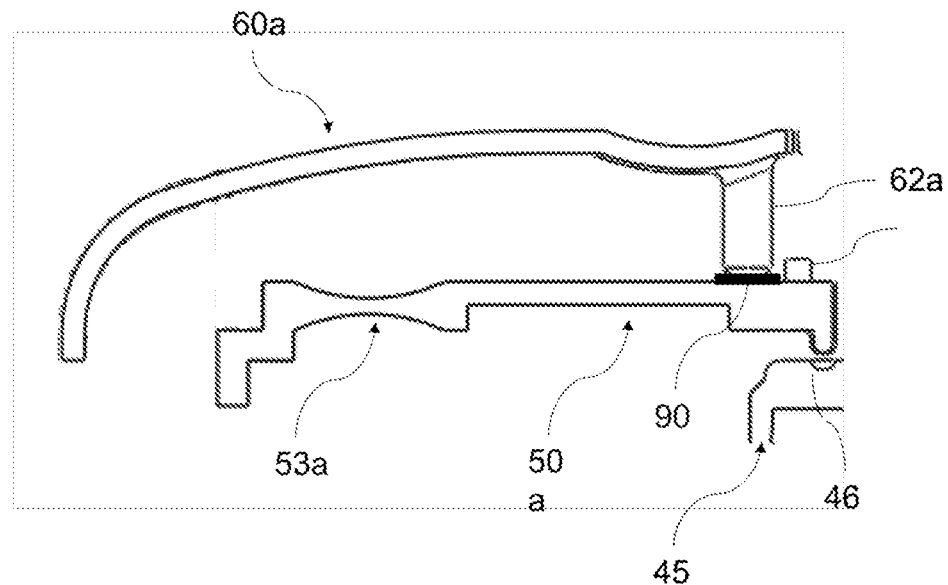
FIG. 9 shows a side view of an interface between a top cap, snap dome, embossing arm, and embossing anvil of an example device in accordance with an implementation of the present concepts.

FIG. 9, shows a side view of the interface between a single top cap button, 60a, with a single embossing arm, 50a, via the downward protruding column, 62a, and the interface between a single embossing arm, 50a, with a concave feature, 45, in the embossing anvil, 45. A snap dome, 90, is held by the attachment feature, 57, between the column, 62a, and the embossing arm, 50a. The hinge 53a, allows the beam to bend, when a force is applied, until the tip contacts the concave feature, 46.

Figure 10:
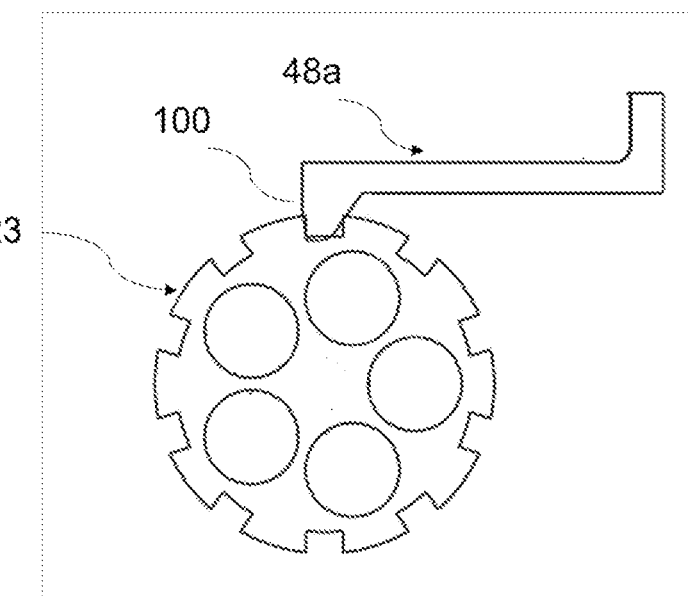
FIG. 10 shows a side view of an interface between a ratchet drum and a pawl of an example device in accordance with an implementation of the present concepts.

FIG. 10 shows a side view of the interface between the ratchet drum, 23, and the pawl, 48a, via the pawl protrusion 100. As the ratchet drum is turned by the tape, the pawl is bent upwards by the applied force and moves into the next groove.

Figure 11:
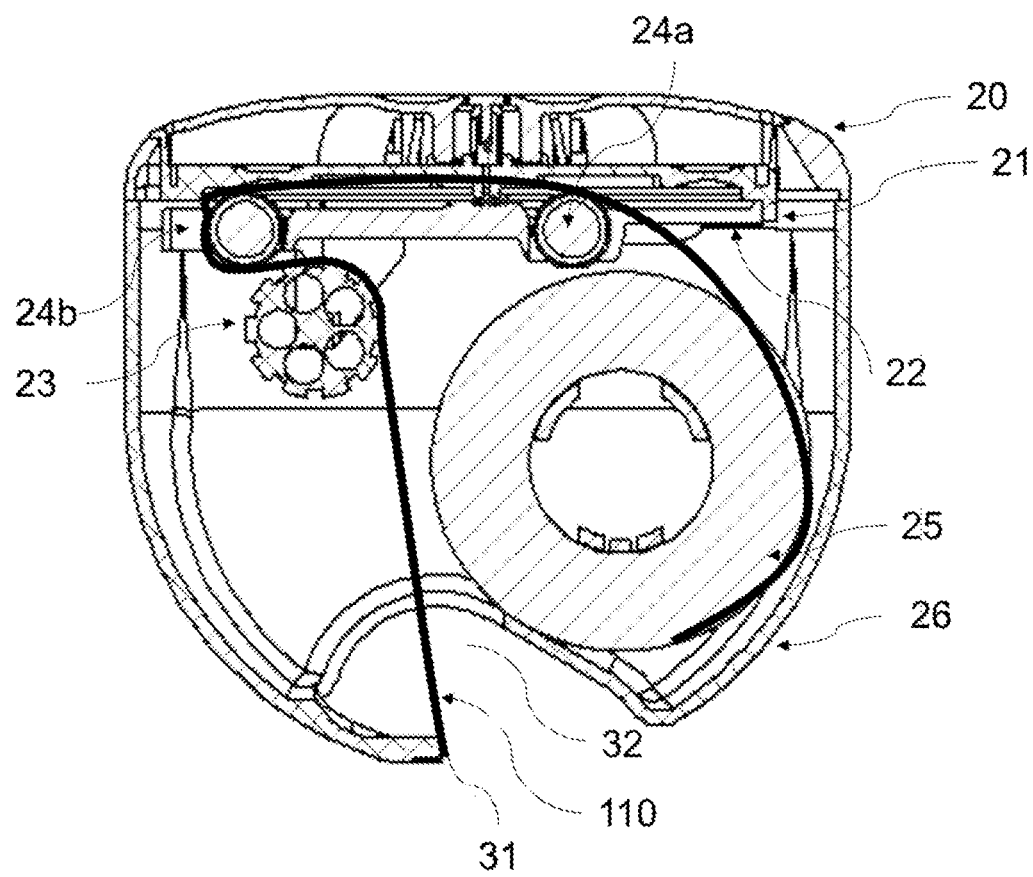
FIG. 11 shows a cross sectional view of an assembled example device with tape routing in accordance with an implementation of the present concepts.

FIG. 11 shows a cross sectional view of the assembled device shown in FIG. 1A. The tape route is shown as the tape, 110, extends from the tape roll, 25, up and over the first tape handling roller, 24a, over the tape handling structure, 22, and underneath the embossing arms, 21. The tape routes around the second tape handling roller, 24b, around the ratchet drum, 23, and down through the base structure, 26, out the tape exit, 32, and sticks to the cutting edge, 31.

Although, the first preferred embodiment of the device uses plastic injection molded parts, the device can also be 3D printed, or stamped out of metal. The primary mechanism uses flexures to emboss the braille dots, and coupled flexures to create ergonomic haptic feedback. Further modifications of the invention will also occur to persons skilled in the art, and all such are deemed to fall within the spirit and scope of the invention as defined by the appended claims.

We claim:

1. A braille writing device, to form tactile dots onto an embossing medium, comprising:
   a. a hollow base structure, open from the top, and graspable by a person's one or two hands, further comprising:
      i. a tape exit port,
      ii. a cutting edge, and
      iii. a top receiving region for a tape handling structure,
   b. the tape handling structure, attached to the base structure's top receiving region, with a planar top region and a downward protruding structure, further comprising:
      i. an embossing anvil on the top planar region, with six concave features arranged in a two-by-three grid,
      ii. pairs of coaxial grooves for accepting cylindrical axles,
      iii. a projecting tape reel axle holding structure which protrudes horizontally from the downward structure, and
      iv. alignment and attachment structures on the planar top region's upper and lower surfaces to guide and connect with the base structure and embossing arms,
   c. a ring embossing arm structure with a planar ring structure to which are attached the embossing arms projecting radially inwards, each of the embossing arms having a flexural hinge member and each of the embossing arms tapering to a convex tip, where the convex tips of the embossing arms form at least three rows of two, further comprising:
      i. the convex tips aligned with the embossing anvil, and
      ii. alignment and attachment features on the planar ring structure's upper and lower surfaces to guide and connect with the base structure below and a top cap above,
   d. the top cap, open on the bottom, the top cap mating with the ring embossing arm structure, with six flexural button arms pointing inwardly, further comprising:
      i. a downward column attached at the distal end of each button arm to transfer forces respectively from the flexural button arms to the embossing arms, and
      ii. a downward facing receiving region for connecting to the ring embossing arm structure, the receiving region including alignment and attachment features.

2. A braille writing device as in claim 1, with the receiving region alignment features including coarse and fine alignment structures, comprised of planar projections, and cylindrical projections respectively.

3. A braille writing device as in claim 1, further including a flexural snap located as an interface between the flexural button arms and flexural hinge members to generate auditory or tactile cues when a dot is formed by a user pressing on the flexural button arms.

4. A braille writing device as in claim 1, further including a mono-stable sound generating snap to give auditory and/or tactile cues when the embossing arms are actuated by the person.

5. A braille writing device as in claim 1, further including concave depressions in the flexural button arms for finger tips to engage to apply forces.

6. A braille writing device, to form tactile dots onto a tape representative of braille characters, comprising a hollow base structure, graspable by a person's one or two hands, with a tape exit port located adjacent a cutting edge, and a top region with at least six flexurally hinged embossing arms for creating individual braille characters, the tips having downwardly projecting convex bump structures, the bump structures located above concave bump receiving structures, a tape holding structure onto which a roll of tape can be placed whereby tape from the roll of tape can pass between the convex bump structures and the concave bump receiving structures and over the cutting edge and out the tape exit port.

7. The braille writing device of claim 6, further including a cover structure with flexurally hinged members with concave fingertip receiving depressions, the flexurally hinged members located above the hinged embossing arms, the hinged embossing arms including a snap dome to provide an audible click and tactile cue when the flexurally hinged members are pushed towards the hinged embossing arms.

8. The braille device of claim 1, further including a ratchet drum with notches equally spaced about the circumference of the drum and a tape guiding roller surface located in the center, with protruding cylindrical axles which rotate in one of the tape handling structure's coaxial groove pairs.

9. The braille device of claim 8, further including a pawl engaging the ratchet drum, and one or more cylindrical tape guiding roller(s) with cylindrical guides for the tape, and with protruding cylindrical axles which rotate in the tape handling structure's coaxial groove pairs.

\* \* \* \* \*